United States Patent [19]

Dalton

[11] Patent Number: 5,761,291
[45] Date of Patent: Jun. 2, 1998

[54] METHOD OF ASSIGNING TELEPHONE AREA CODES

[75] Inventor: Gary R. Dalton, Green Brook, N.J.

[73] Assignee: Lucent Technologies Inc., Murray Hill, N.J.

[21] Appl. No.: 263,963

[22] Filed: Jun. 22, 1994

[51] Int. Cl.[6] ................................................. H04M 3/42
[52] U.S. Cl. .................... 379/220; 379/201; 379/207; 379/289; 379/216
[58] Field of Search ........................... 379/207, 201, 379/220, 289, 142, 213, 211, 212, 355, 216

[56] References Cited

U.S. PATENT DOCUMENTS

| | | | |
|---|---|---|---|
| 4,899,373 | 2/1990 | Lee et al. | 379/207 |
| 4,980,907 | 12/1990 | Raith et al. | 379/58 |
| 4,994,926 | 2/1991 | Gordon et al. | 358/400 |
| 5,222,125 | 6/1993 | Creswell | 379/201 |
| 5,251,248 | 10/1993 | Tokunago et al. | 379/207 |
| 5,272,749 | 12/1993 | Masek | 379/216 |

OTHER PUBLICATIONS

"FCC Receives Diverse Opinions on Suitability of 'NII' Numbers for Public Use", Telecommunications Reports, vol. 60, No. 35 29 Aug. 1994.
"Newsbytes Daily Summary Feb. 20, 1997", Newsbytes Newsletter.
"'N-I-I' Update", Telemedia News & Views, Feb. 1994.
Bill McAllister, "Loss of Zip Causes Dip in Patent Office's Mail", Aug. 9, 1996, Washington Post, p.-A15.

*Primary Examiner*—Ahmad F. Matar
*Attorney, Agent, or Firm*—Frederick B. Luludis

[57] ABSTRACT

The processing of a telephone call identified in part by an area code associated with a particular geographical area results in forwarding the call to telephone equipment located in the geographical area. Such processing is enhanced by associating a unique area code with an entity other than a geographical region or telephone service and then forwarding a telephone call identified in part by the unique area code to telephone equipment associated with the entity even though that equipment may be located in a geographical area associated with a different area code.

11 Claims, 3 Drawing Sheets

METHOD OF ASSIGNING TELEPHONE AREA CODES

FIELD OF THE INVENTION

The invention relates to telecommunications networks and more particularly relates to telephone area codes.

BACKGROUND OF THE INVENTION

As is well-known, a conventional telephone number comprises three fields -- an area code, exchange code and a line code. As is also well-known, an area code is associated with a particular region ("area") within the North American telephone dialing plan, in which an area code may be associated with either a very large area or a relatively smaller area. For example, the State of Montana is associated with an area code of 406 while the much smaller State of South Carolina is associated with an area code of 803, as shown in FIG. 1. Moreover, the size of a State is not indicative of the number of telephone area codes that may be assigned thereto. For example, compare the State of Ohio, which is associated with four area codes, 216, 419, 513 and 614 (as shown in FIG. 1), with the State of Montana, which, as mentioned above, is associated with just one area code. The reason for such a disparity is that the State of Ohio is more densely populated than the State of Montana and thus requires a greater number of telephone numbers.

Moreover, a particular area code may be readily recognized as being associated with a particular geographical area. For example, an appreciable number of people outside of the New York Metropolitan area readily recognize and associate the area code of 212 with New York City. The same is true for other areas, for example, San Francisco (area code 415), Washington, D. C. (area code 202), Miami (area code 305), etc. Thus, an area code may serve a very large area such as a State (e.g. the State of Montana) or a small area, such as a section of a State (e.g., New York City) and may become acutely associated therewith.

SUMMARY OF THE INVENTION

I have recognized that although an area code is associated with a particular graphical area (large or small) there is a need to associate an area code with a particular entity. In this sense, a telephone area code, unlike a vanity telephone number, would be widely recognized and solely associated with the entity. For example, if a particular business was solely associated with a unique area code, then it is likely that an appreciable number of people would associate the area code with the business, rather than a particular geographical area. In this sense, then, the area code would be akin to a trademark for the business.

DETAILED DESCRIPTION

Figure 1:
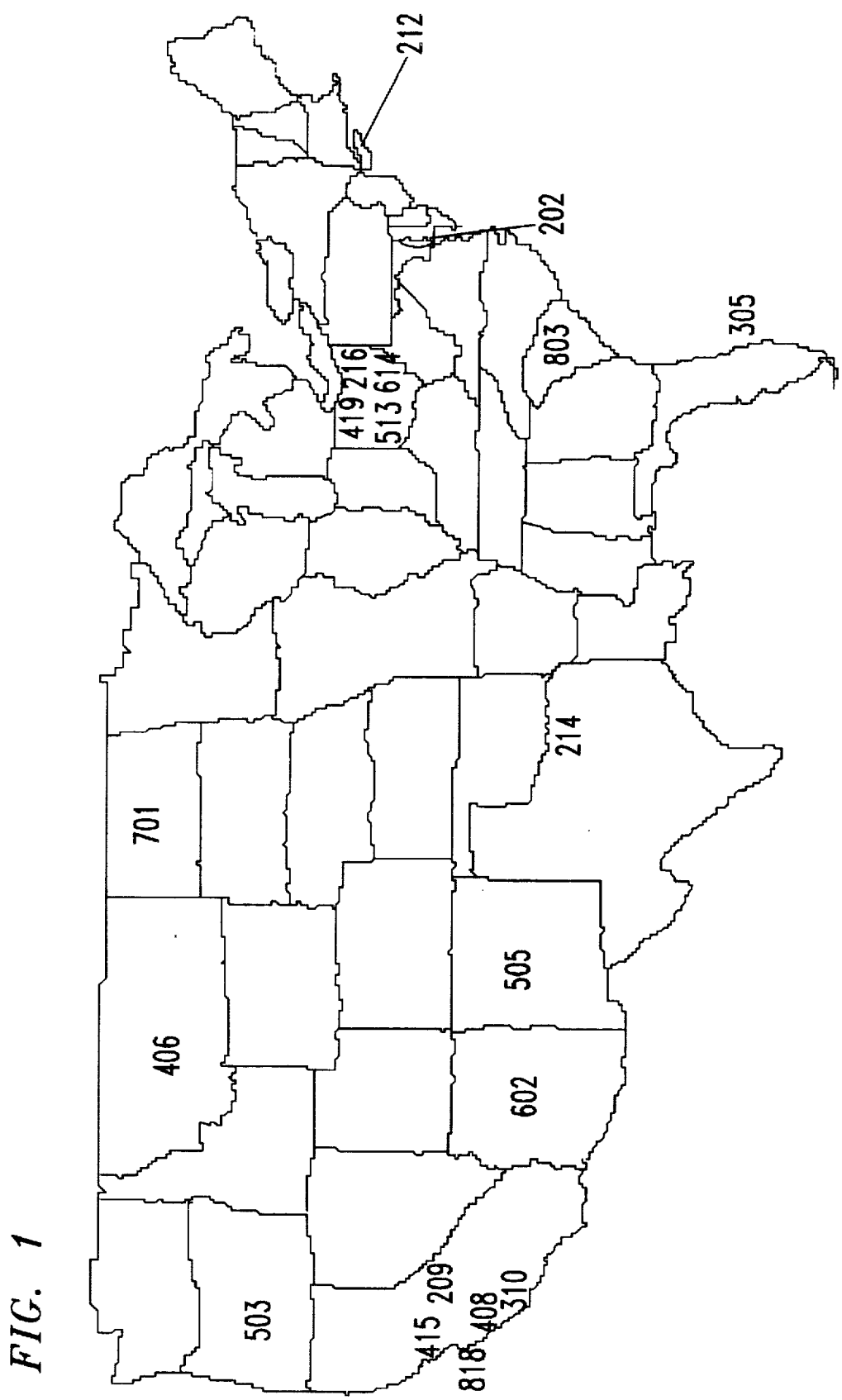
FIG. 1 illustrates a map of the United States of America and the assignment of a number of telephone area codes to particular geographical areas.
Figure 2:
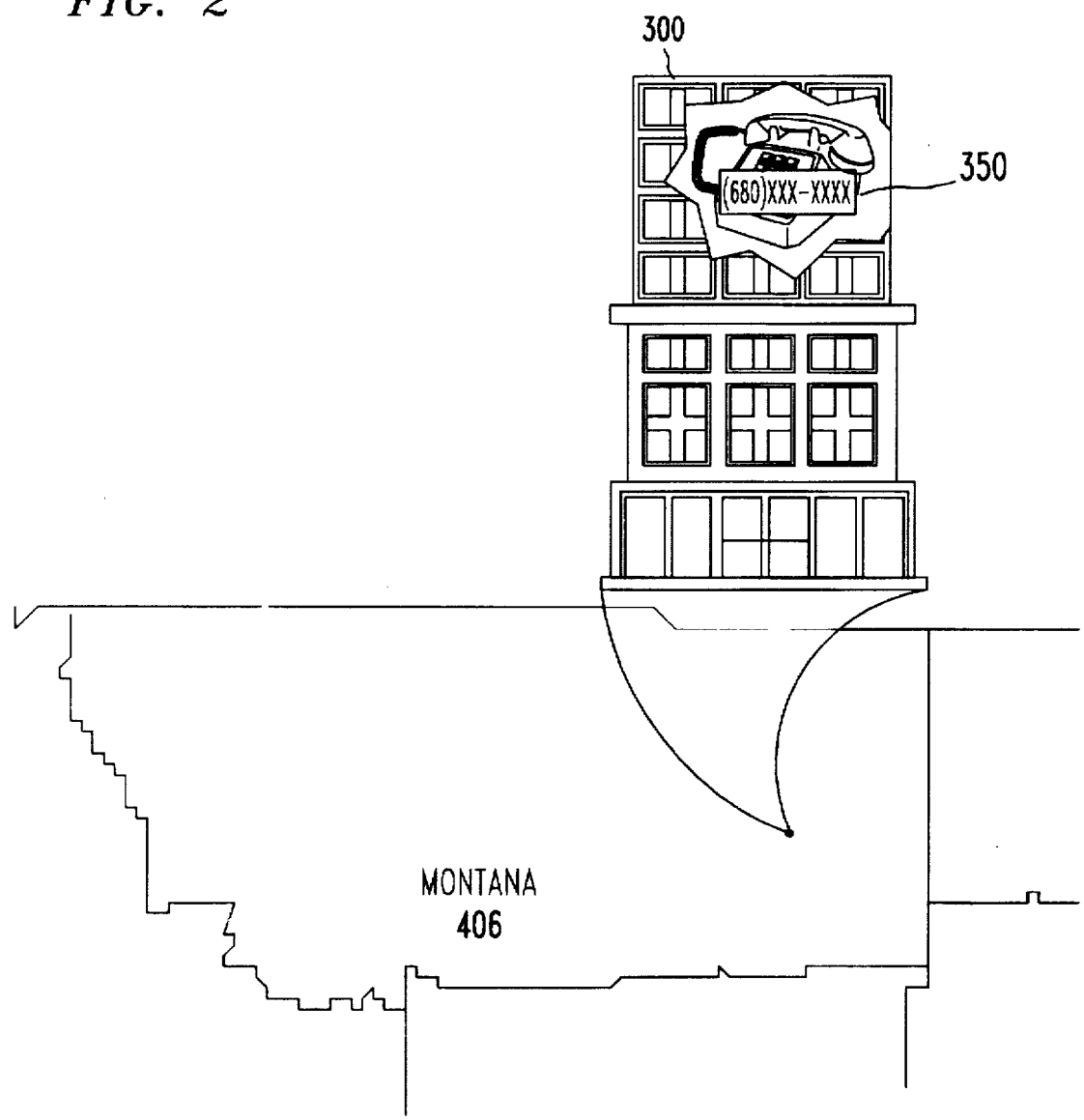
FIG. 2 is an illustrative example of one way in which an area code may be assigned in accord with the principles of the invention.

Turning now to FIG. 2, assume that a unique area code, e.g., area code 680, has been assigned, in accord with an aspect of the invention, to a particular entity, rather than to a graphical area. Also assume that the location of the entity is an office located within a building situated within the State of Montana, and that the entity offers a particular telephone service, for example, a service of the type disclosed in U.S. Pat. No. 5,222,125 issued Jun. 22, 1993 to C. W. Creswell et al, namely a service for providing personalized telephone calling features. Disadvantageously, the latter service is associated with a service (prefix) code of 700 that may also be used by other services. As such, the code is not unique to the service. However, if the service were assigned a unique code, which is assumed to be the case (i.e., code 680), then there is a good chance that the public will associate the assigned code with the service in the way that a trademark is associated with a source of particular goods. Then, as a result of such an assignment, telephone calls associated with entity code 680 will be forwarded to entity, or adjunct 350. This would be true regardless of the exchange and telephone line codes that a caller may dial after dialing code 680. What this means is that if a caller dials 680 and then dials a string of seven arbitrary numbers, the associated telephone call will, nevertheless, be forwarded to adjunct 350. Thus, in this sense, an entity or service may be associated with a unique area code and any arbitrary string of numbers forming the exchange and line codes. However, that would not be the case if adjunct 350 were assigned one of the conventional service codes, i.e., 700, 800, 900, etc. (It is to be understood, of course, that, in accord with an aspect of the invention, a unique area code may be associated with something other than an entity, service or geographical area, for example, an individual.)

Figure 3:
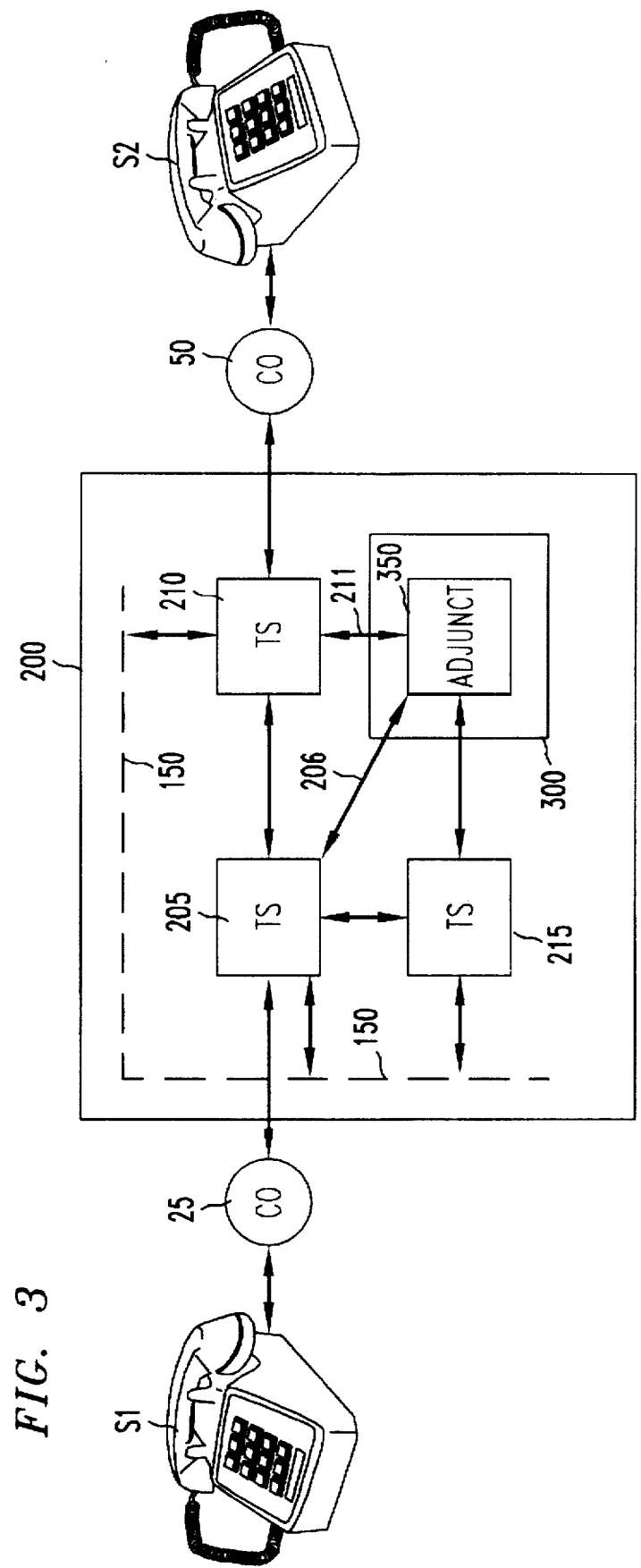
FIG. 3 illustrates in block diagram form a communications network in which the principles of the invention may be practiced.

Turning now to FIG. 3, telecommunications network 200, which may be, for example, the AT&T public switched network, provides a number of different calling services for its subscribers, e.g., the subscribers associated with stations S1 and S2. Such services may be implemented, for example, in an adjunct in the manner disclosed in the aforementioned C. W. Creswell et al patent.

Network 200, more particularly, includes, inter alia, a plurality of interconnected Toll Switching (TS) offices, three of which are shown in the FIG., namely TS 205, 210 and 215. Such toll switches may be any one of a number of different well-known types of switching equipments, such as, for example, the No. 4ESS (Electronic Switching System) commercially available from AT&T. Such toll switches and service adjunct 350 are also interconnected via data link 150, which may be a part of, for example, the well-known Common Channel Signaling network (CCS). The toll switches exchange data messages with one another via CCS network 150 to forward a telephone call from an originating point (e.g., TS 205) to a destination point (e.g., service adjunct 350) within network 200.

Each toll switch, e.g., TS 205, may also be connected to one of a plurality of Central Offices (CO), such as COs 25 or 50. As is well-known, a CO operates in a conventional manner to forward a call associated with a long distance telephone number to an associated toll switch, e.g., TS 205 or 210, and forward a call that it receives from an associated toll switch (destination switch) to an intended destination, e.g., station S2.

With the foregoing in mind, assume at this point that the telephone user associated with station S1 desires to place a call to station S2 via adjunct 350. To do so, assume that the user dials either (a) a telephone number, e.g., 680-555-1234, assigned to the user as a result of subscribing to services provided by adjunct 350 or (b) any seven arbitrary numbers preceded by the code of 680. In either case, CO 25, upon recognizing that a call is being placed to a ten digit telephone number, forwards the telephone number and associated telephone call to TS 205. TS 205 responsive thereto translates, in a conventional manner, the received telephone number into a routing number. In this case, a routing number derived from the 680 code identifying the network 200 path, e.g., path 206, that is used to forward the call and associated call information (e.g., called and calling telephone numbers) to adjunct 350. Adjunct 350, responsive to receipt of the call, processes the call in accord with the telephone service that adjunct 350 implements, e.g., the service disclosed in the above-mentioned C. W. Creswell patent. At this point, the station S1 caller may interact with adjunct 350 to place a call to station S2.

As mentioned above, the station S1 user may dial 680 followed by seven arbitrarily selected digits. If that is case, then adjunct 350, upon receipt of the call, may request entry of a Personal Identification Number (PIN) and associate the caller with the entered PIN if valid. If the caller does not respond to the request or if the entered PIN is not valid, then adjunct 350 may pass the call to an attendant for processing.

In accord with an aspect of the invention, the telephone number (NXX-XXXX) that adjunct 350 assigns to a sub-subscriber may be, for example, the caller's home telephone number. As such, adjunct 350 may ascertain the location, (e.g., the caller's homes, business, etc.) from which a caller is calling (and possibly the identity of the caller) as a function of the ANI that accompanies an incoming call. That is, if a caller dials 680 and his/her home telephone number, then adjunct 350 matches the NXX-XXXX portion of the ANI (i.e. the calling telephone number) that it receives from a toll switch with the NXX-XXXX of the dialed telephone number (i.e., called number). If they match, then adjunct 350 may use the dialed number to determine indirectly the address of a memory location containing an associated subscriber record, in which a field in the record contains the subscriber's ANI. Adjunct 350 may then match the received ANI with the ANI contained in the identified subscriber record. If a match occurs, then it would not be necessary to request entry of a PIN or some other form of identification, e.g., a voice print, since the caller has been uniquely identified by the received ANI and dialed telephone number.

If the calling NXX-XXXX does not match the dialed NXX-XXXX, then adjunct 350 would need to request entry of a PIN as a way of identifying the caller.

(It is noted that if the same NXX-XXXX is used in different geographical areas (NPAs), and callers in those areas subscribe to the services provided by adjunct 350, then the adjunct 350 records associated with those subscribers may be linked (stringed) to one another in a conventional manner. In that instance, then, adjunct 350 responsive to a call involving one of those numbers, would match the received ANI with the ANI stored in a first one of the linked records. If the match fails, then adjunct 350 would repeat the match using the ANI stored in a next one of the linked records, and so on, until a match is found. Similarly, adjunct 350 would request entry of a PIN if no match is found after interrogating the last of the linked records.)

The foregoing is merely illustrative of the principles of the invention. Those skilled in the art will be able to devise numerous arrangements, which, although not explicitly shown or described herein, nevertheless embody those principles that are within the spirit and scope of the invention. For example, as mentioned above, a unique "area" or prefix code may be associated with an individual who may be associated with both a wired and wireless telephone service.

In that case, then, a call identified in part by the individual's "area" or prefix code and other digits may be routed to the individual via the wired network and/or wireless telephone network. As a further example, adjunct 350 may be arranged to implement a number of different services and/or features including (a) greeting a subscriber in a language of his/her choice; (b) a message service in which adjunct 350 alerts a caller to a waiting message(s); (c) presenting to a caller important/particular information relating to the happening of an event that is of interest to the caller, such as financial information directed to, e.g., the price of a particular stock reaching a predetermined level; (d) alerting the caller to particular business discounts and/or promotions (e.g., telephone calling discounts, airline ticket discounts, hotel discounts, etc.), (e) presenting a graphical user interface to a caller if the caller is using a device other than a conventional telephone station set, e.g., a personal computer, (f) responding to personalized voice commands, such as "call home", and/or (g) verifying a caller's identity using speech recognition techniques, etc. Moreover, and as a further example, the telephone number that a caller dials to reach adjunct 350 may be used to identify the type of device that the caller is using to place the call when the device is other than a conventional telephone station, e.g., a personal computer or the like. In addition, and as a further example, the claimed invention may be similarly used in wireless telephone systems as well as cable systems.

I claim:

1. A method of assigning telephone area codes comprising the steps of associating area codes with respective geographical regions as a way of identifying telephone station sets disposed wiin respective ones of said regions and connected to an associated telephone network, and associating at least one unique, unassigned area code with an entity other than a geographical region in which said unique area code is other than a prefix code assigned to a telephone service, and wherein a long distance telephone call forwarded to said entity and terminated thereat is identified by said unique area code and a local telephone number.

2. The method of claim 1 wherein said entity is an individual.

3. The method of claim 1 wherein said entity is a business.

4. The method of claim 1 wherein said entity is an adjunct disposed in said telephone network.

5. The method set forth in claim 1 wherein said local telephone number is a telephone number assigned to a telephone station set originating said telephone call.

6. A method of assigning telephone area codes comprising the steps of assigning telephone area codes to respective geographical areas as a way of identifying uniquely telephone station sets disposed in respective ones of said areas, associating different groups of telephone services with respective service prefix codes, and assigning a unique, unassigned area code to an entity other than a geographical area such that long distance telephone calls identified by the unique area code and respective local telephone numbers are forwarded via respective telephone network connections terminating at said entity.

7. The method set forth in claim 6 wherein said entity is an individual.

8. The method set forth in claim 6 wherein said entity is a business.

9. The method set forth in claim 6 wherein said entity is telephone equipment associated with said network.

10. The method set forth in claim 6 wherein one of said local telephone numbers is a telephone number associated with a telephone station set originating one of said telephone calls.

11. A method of processing a telephone call comprising the steps of routing a telephone call identified in part by an area code assigned to a particular geographical region to particular telephone equipment disposed in said geoographical region. and routing and terminating a long distance telephone call identified in part by a unique area code exclusively assigned to an entity other than a geographical region and in part by an arbitrary local telephone number at telephone equipment associated with said entity. in which said unique area code assigned to said entity is a code other than a service prefix code associated with a respective telephone service.

* * * * *